(12) United States Patent
Dorscheid et al.

(10) Patent No.: US 7,479,638 B2
(45) Date of Patent: Jan. 20, 2009

(54) ARRANGEMENT OF A SCINTILLATOR AND AN ANTI-SCATTER-GRID

(75) Inventors: Ralf Dorscheid, Kerkrade (NL); Gereon Vogtmeier, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 38 days.

(21) Appl. No.: 11/573,357

(22) PCT Filed: Aug. 8, 2005

(86) PCT No.: PCT/IB2005/052623

§ 371 (c)(1),
(2), (4) Date: Feb. 7, 2007

(87) PCT Pub. No.: WO2006/016341

PCT Pub. Date: Feb. 16, 2006

(65) Prior Publication Data

US 2008/0093559 A1 Apr. 24, 2008

(30) Foreign Application Priority Data

Aug. 10, 2004 (EP) ................... 04103847

(51) Int. Cl.
*G01T 1/20* (2006.01)
(52) U.S. Cl. .................................... 250/367
(58) Field of Classification Search ................. 250/367, 250/366
See application file for complete search history.

(56) References Cited

U.S. PATENT DOCUMENTS

| | | | |
|---|---|---|---|
| 4,870,279 A * | 9/1989 | Cueman et al. | 250/368 |
| 4,982,096 A | 1/1991 | Fujii et al. | |
| 5,712,483 A * | 1/1998 | Boone et al. | 250/367 |
| 6,362,481 B1 | 3/2002 | Warren | |
| 6,553,092 B1 | 4/2003 | Mattson et al. | |
| 6,898,265 B1 * | 5/2005 | Mliner et al. | 378/19 |
| 2001/0002699 A1 | 6/2001 | Such et al. | |
| 2003/0234363 A1 | 12/2003 | Sekine et al. | |

FOREIGN PATENT DOCUMENTS

| | | |
|---|---|---|
| DE | 199 23 372 A1 | 7/2000 |
| JP | 04002989 A | 1/1992 |

* cited by examiner

*Primary Examiner*—David P Porta
*Assistant Examiner*—Kiho Kim

(57) ABSTRACT

The invention relates to the production of a scintillator system which comprises an Anti-Scatter-Grid (20) and an arrangement of scintillator cells. In a first processing step, a rectangular pattern of slots (11, 12) is cut into the top surface of a scintillator crystal (10). An Anti-Scatter-Grid (20) is then inserted with one end into said slots and fixed there with a glue. Finally, the top layer (thickness d) is separated from the scintillator crystal (10) yielding the desired scintillator system.

12 Claims, 1 Drawing Sheet

ARRANGEMENT OF A SCINTILLATOR AND AN ANTI-SCATTER-GRID

The invention relates to a method for the manufacture of a scintillator system comprising an arrangement of separate scintillator cells and an Anti-Scatter-Grid. Moreover, the invention comprises such a scintillator system and an X-ray detector.

X-ray detectors are for example used in medical imaging devices for CT (Computed Tomography), PET (Positron Emission Tomography), SPECT (Single Photon Emission Computed Tomography), nuclear imaging and the like. X-ray detectors of the so-called indirect conversion type contain a scintillator that converts incident X-rays into secondary radiation of another energy, for example into visible photons. The secondary radiation can then be detected by appropriate sensor units, for example photosensors. Moreover, it is known to use an Anti-Scatter-Grid (ASG) in order to improve the image quality of a detector. ASGs are produced from a material that strongly absorbs incident radiation, wherein the grid comprises straight channels that typically are arranged parallel to each other or focused to a source of radiation. An ASG lets only such rays pass that are aligned with said channels, thus providing a definite line of sight for sensor units behind the ASG.

From the U.S. Pat. No. 6,553,092 B1 an X-ray detector is known which comprises two consecutive layers of different scintillation materials. In some embodiments described in this document, the outer scintillation layer consists of zinc selenide and comprises parallel grooves on its surfaces in order to inhibit crosstalk and to provide mounting slots for plates of a one-dimensional Anti-Scatter-Grid. The lower scintillation layer consists of separate cuboid cells that are covered with a reflective coating in order to avoid crosstalk of visible photons generated in the scintillator.

Based on this situation, it was an object of the present invention to provide a scintillator system for a detector with a high image quality that can be produced with reasonable costs.

This object is achieved by manufacturing method according to claim 1, by scintillator systems according to claims 8 and 9, and by an X-ray detector according to claim 10. Preferred embodiments are disclosed in the dependent claims.

According to a first aspect, the invention provides a method for the manufacture of a scintillator system that comprises a (multipart) arrangement of separate scintillator cells and an Anti-Scatter-Grid. The method comprises at least the following steps:

a) The cutting of slots into a scintillator crystal, wherein the cutting is executed such that the crystal is not divided into several pieces. This means that the scintillator crystal with the slots remains an integral object that may be handled as one piece.

b) The inserting of plates of a radiation absorbing material into the aforementioned slots, wherein preferably one plate is inserted into one slot each. The scintillator crystal may particularly consists of a material that converts X-rays into visible photons, and the plates may consist of a material that strongly absorbs X-rays. Thus the plates will constitute an Anti-Scatter-Grid in their final arrangement. Moreover, the slots are preferably straight and the plates are preferably planar, while of course more complicated curved forms are possible, too.

c) The final cutting of the scintillator crystal such that the desired arrangement of separate scintillator cells results. This means that the final cut(s) divide the previously one-piece scintillator crystal into a plurality of different pieces or "scintillator cells".

With the method described above a scintillator system can be achieved that integrally comprises a plurality of scintillator cells and an Anti-Scatter-Grid. Said scintillator system has several advantages. First, the production of said system is facilitated due to the fact that the scintillator crystal can be handled as an one-piece object until the final cutting in step c) is done. Secondly, the plates of the Anti-Scatter-Grid and the scintillator cells are "automatically" aligned to each other with high precision which improves the image quality that can be achieved with such a scintillator system. Moreover, the different scintillator cells can be completely separated from each other by the plates, yielding an arrangement in which crosstalk between the scintillator cells is inhibited.

In a further development of the method, the slots and/or the plates are at least partially coated with a glue before the plates are inserted, i.e. between steps a) and b). Such a coating may for example be achieved by dipping the scintillator crystal and/or the plates at least partially into a liquid glue. The glue then fixes the plates of the absorbing material to the scintillator crystal when they are put together. After the final cutting in step c), the glue fixes the separated scintillator cells to the plates and thus provides cohesion of the whole scintillator system. The glue is preferably cured after the plates have been inserted into the slots in step b) and before the final cutting of step c) takes place.

According to a further development of the aforementioned embodiment, the glue is (at least in its cured state) reflective for electromagnetic radiation of a certain spectrum. Such a reflectivity may for example be achieved by adding particles with appropriate reflective properties to a conventional glue or adhesive. Preferably, the glue is reflective for the kind of secondary radiation that is generated in the scintillator crystal, e.g. for visible photons which are generated by an X-ray sensitive scintillator crystal. Due to the reflectivity of the glue, photons which are generated in one scintillator cell are prevented from passing to a neighboring cell. Thus crosstalk is inhibited without loss of the photons for the detection process, which improves the sensitivity of the device.

In principle, the slots can be cut into the scintillator crystal in step a) arbitrarily as long as they do not divide it into several pieces. The slots might for example be cut into the scintillator crystal starting from two or more different directions. In a preferred embodiment, the scintillator crystal has one planar surface into which all the slots are cut. The scintillator crystal may for example have the form of a cylinder or a cuboid, one planar face of which is structured by perpendicular slots in step a).

According to another embodiment, the slots are cut in a regular pattern, especially a rectangular pattern of parallel slots in a first direction and parallel slots in a second direction that is orthogonal to the first one.

The scintillator cells that are achieved by the final cutting in step c) are preferably cuboid cells. In this case, two opposing faces of the cells may be used for the entrance of a primary radiation (e.g. X-rays) and the emission of an induced secondary radiation (e.g. visible photons), respectively. The residual faces of the cuboid may contact the plates of the absorbing material which prevent crosstalk between neighboring scintillator cells.

According to another preferred embodiment, the plates of the absorbing material are at least partially covered with a material that is reflective for electromagnetic radiation of a certain spectrum. The plates may for example have a white coating that reflects photons back into the adjacent scintillator cells, producing the same advantageous effect as the reflective glue described above.

The invention further comprises a scintillator system with an arrangement of separate scintillator cells and an Anti-Scatter-Grid, wherein at least some of the scintillator cells are completely disposed within the channels of the Anti-Scatter-Grid. The Anti-Scatter-Grid may be one-dimensional or preferably two-dimensional. The scintillator cells typically extend from one end of the channels over a (small) fraction of the length of the channels.

According to a further development of the aforementioned scintillator system, the scintillator cells originate from the same, single scintillator crystal and are disposed in relative locations that are identical to their relative locations in said crystal. Such a scintillator system may particularly be produced by a method of the aforementioned kind.

Finally, the invention comprises an X-ray detector with
An array of photosensors (pixels), e.g. photodiodes, photocells or the like.
A scintillator system of the aforementioned kind that is arranged above said array. Preferably, the photosensors and the scintillator cells are aligned such that just one photosensor is located underneath each scintillator cell.

The aforementioned scintillator systems and the X-ray detector rely on the features of the method described above. For more information on details, improvements and advantages of the scintillator systems and the detector, reference is therefore made to the description of said method.

These and other aspects of the invention will be apparent from and elucidated with reference to the embodiment(s) described hereinafter.

In the following the invention is described by way of example with the help of the accompanying drawings in which.

During the conventional manufacture of an X-ray detector, an array of photosensors or pixels on a detector chip, an arrangement of scintillator cells, and a one- or two-dimensional Anti-Scatter-Grid have to be assembled and aligned with each other separately. This procedure is rather laborious and prone to the accumulation of tolerances from the different alignment steps. Therefore, an alternative manufacturing method is described in the following that is easier and less critical with respect to alignment tolerances.

The production of the proposed scintillator system starts with the preparation of a scintillator crystal and an ASG. The crystal may consist of any suitable scintillator material, e.g. of $CdWO_4$ or GOS ($Gd_2O_2S$), and it may particularly have the form of a cylinder with planar and parallel top and bottom surfaces. One of these surfaces, for example the top surface, is optionally prepared by polishing or similar procedures. Said surface is then structured with a rectangular pattern by cutting parallel slots in a first direction and cutting parallel slots in an orthogonal second direction. The result of this cutting can be seen in FIG. 1 which shows the cylindrical scintillator crystal 10 having slots 11, 12 in perpendicular directions in its top surface. The slots may for example be cut into the surface with a high-precision saw (blade or wire) to a depth d of for example 10 μm to 5 mm. The tolerance of the slots 11, 12 will be within a few μm with the width of the slots ranging typically from 10 to 20 μm.

Figure 1:
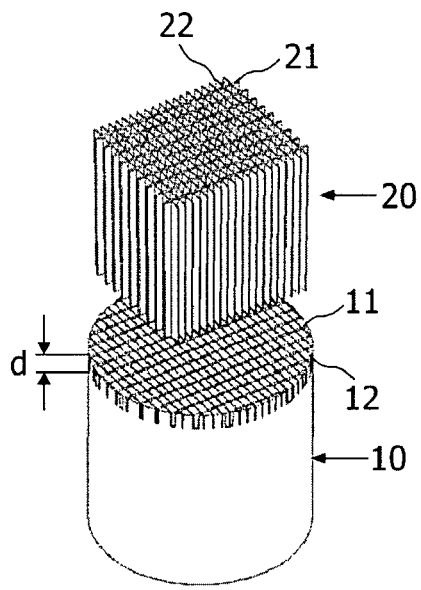
FIG. 1 shows a perspective view of a scintillator crystal and an Anti-Scatter-Grid (ASG) after cutting slots into one surface said crystal.

FIG. 1 further shows a prefabricated two-dimensional Anti-Scatter-Grid 20 that consists of a rectangular pattern of parallel plates 21 in a first direction that cross with parallel plates 22 in a second direction orthogonal to the first one. The plates 21, 22 are made of a material which strongly absorbs X-radiation, typically a heavy-metal with an atomic weight Z>50 like tungsten (W) or molybdenum (Mo).

Figure 2:
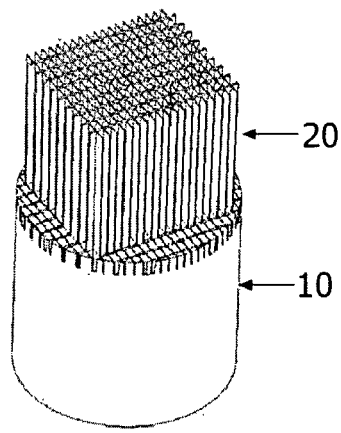
FIG. 2 shows the components of FIG. 1 after insertion of the ASG into the slots.

The spacing of the metal plates 21, 22 in the ASG 20 corresponds to the spacing of the slots 11, 12 in the surface of the scintillator crystal 10, while the width of the slots 11, 12 is equal to (or slightly larger than) the thickness of the plates 21, 22. The lower end of the ASG 20 may therefore be inserted into the slots as shown in FIG. 2. Before this insertion is done, the structured scintillator crystal 10 is coated (at least on its structured top surface) with a reflective glue, which may for example be done by a dip-coat process. Additionally or alternatively, the lower end of the ASG 20 may be provided with a coating of glue, too. After insertion of the ASG 20 into the slots of the scintillator crystal 10, the glue has to cure, which may for example be started and/or accelerated by ultraviolet radiation or by heat in a furnace process.

Figure 3:
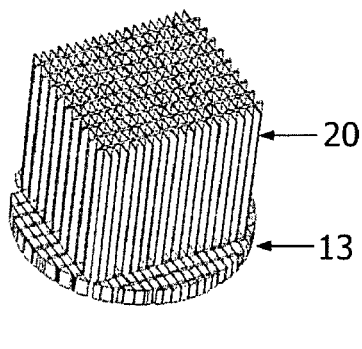
FIG. 3 shows the components of FIG. 2 after a first final cutting.

After the curing of the glue, the ASG 20 is permanently fixed on the scintillator crystal 10. In the next processing step, a layer of thickness d is separated from the scintillator crystal 10 by a cut parallel to the top surface, yielding the combination of an ASG 20 with a disk-shaped arrangement 13 of scintillator cells shown in FIG. 3.

Figure 4:
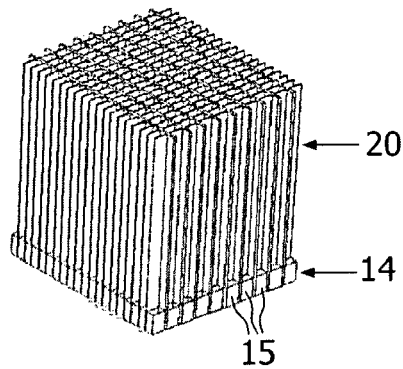
FIG. 4 shows the components of FIG. 3 after a further final cutting.

Finally, the segments of the scintillator disk that project over the rectangular base of the ASG 20 are cut away. FIG. 4 shows the resulting scintillator system that comprises a two-dimensional Anti-Scatter-Grid 20 which is integrally combined with a rectangular arrangement 14 of separate cuboid scintillator cells 15 disposed between the plates of the ASG 20. After the final cutting, the bottom surface of the scintillator arrangement 14 may optionally be further processed (e.g. polished) for its intended use.

While a preferred manufacturing method for a scintillator system was described above, the invention generally comprises any scintillator system like that shown in FIG. 4 in which separate scintillator cells 15 are disposed in the channels of a (one- or two-dimensional) ASG irrespective of its manufacturing method. Such a scintillator system can be handled as a single, one-piece object and does not need additional alignment between the scintillator cells 15 and the ASG 20. Such a scintillator system may be used in all apparatuses that require Anti-Scatter-Grids and scintillators, for example in detectors for an X-ray CT or for nuclear medicine. Moreover, several of the scintillator systems shown in FIG. 4 may be arranged side by side to cover arbitrarily large areas.

Finally it is pointed out that in the present application the term "comprising" does not exclude other elements or steps, that "a" or "an" does not exclude a plurality, and that a single processor or other unit may fulfill the functions of several means. Moreover, reference signs in the claims shall not be construed as limiting their scope.

The invention claimed is:

1. A method for the manufacture of a scintillator system comprising an arrangement of separate scintillator cells and an Anti-Scatter-Grid, the method comprising the following steps:
   a) cutting slots into a cylindrically shaped scintillator crystal, which has planar and parallel top and bottom surfaces, without dividing it into several pieces; wherein the top surface is structured with a rectangular pattern by cutting parallel slots in a first direction and cutting parallel slots in a second orthogonal direction;
b) inserting plates of a radiation absorbing material into the slots;
c) separating a layer containing the plates of the radiation absorbing material in the cut slots by a cut parallel to the top surface, wherein the remaining cylindrical scintillator crystal has a disk-shaped arrangement; and
d) final cutting of the scintillator crystal such that the segments of the scintillator crystal forming the disk that project over the rectangular base of the plates of the radiation absorbing material are cut away, resulting in a required arrangement of separate scintillator cells.

2. The method according to claim 1, wherein the slots and/or the plates are at least partially coated with a glue before the plates are inserted into the slots, wherein the glue is preferably cured before the separating in step c).

3. The method according to claim 2, wherein the glue is reflective.

4. The method according to claim 1, wherein the scintillator crystal has at least one planar surface into which the slots are cut.

5. The method according to claim 1, wherein the slots are cut in a regular pattern, preferably a rectangular pattern.

6. The method according to claim 1, wherein the final cutting in step c) separates cuboid cells from the scintillator crystal.

7. The method according to claim 1, wherein the plates are at least partially covered with a reflective material.

8. The method according to claim 1, wherein the cut slots range in width from 10 to 20 µm.

9. The method according to claim 8, wherein the cut slots range in depth from 10 µm to 5 mm.

10. The method according to claim 9, wherein the spacing of the plates of the radiation absorbing material corresponds to the spacing of the slots as cut into the scintillator crystal, with the width of the cut slots being equal to the thickness of the plates.

11. The method according to claim 10, wherein prior to final cutting a layer is separated from the combined scintillator crystal and inserted plates of radiation absorbing material by a cut parallel to the top surface, with this cut yielding a disk-shaped arrangement of scintillator cells.

12. The method according to claim 1, wherein after the final cutting a bottom surface of the scintillator arrangement is polished.

* * * * *